(12) United States Patent
Silverbrook

(10) Patent No.: US 7,583,979 B2
(45) Date of Patent: *Sep. 1, 2009

(54) MOBILE PHONE FOR CAPTURING AND PRINTING IMAGES

(75) Inventor: Kia Silverbrook, Balmain (AU)

(73) Assignee: Silverbrook Research Pty Ltd, Balmain, New South Wales (AU)

( * ) Notice: Subject to any disclaimer, the term of this patent is extended or adjusted under 35 U.S.C. 154(b) by 0 days.

This patent is subject to a terminal disclaimer.

(21) Appl. No.: 12/246,497

(22) Filed: Oct. 6, 2008

(65) Prior Publication Data
US 2009/0029732 A1 Jan. 29, 2009

Related U.S. Application Data

(63) Continuation of application No. 11/635,482, filed on Dec. 8, 2006, now Pat. No. 7,460,882, which is a continuation of application No. 11/144,800, filed on Jun. 6, 2005, now Pat. No. 7,158,809, which is a continuation of application No. 10/159,626, filed on Jun. 3, 2002, now Pat. No. 6,915,140, which is a continuation of application No. 09/436,507, filed on Nov. 9, 1999, now Pat. No. 6,405,055.

(30) Foreign Application Priority Data
Nov. 9, 1998 (AU) .................................. PP7021

(51) Int. Cl.
H04Q 7/32 (2006.01)

(52) U.S. Cl. ............... 455/550.1; 455/403; 455/557; 455/422.1; 455/575.1; 455/556.1; 358/502; 358/503; 358/508; 358/473; 379/428.01; 379/433.01

(58) Field of Classification Search ............... 455/403, 455/422.1, 566, 344, 557, 556.1, 556.2, 575.1, 455/517, 500, 66.1, 575.4, 90.1, 90.2, 90.3, 455/412.1, 412.2, 550.1; 358/502, 503, 508, 358/473; 379/428.1, 433.01
See application file for complete search history.

(56) References Cited

U.S. PATENT DOCUMENTS 5,144,340 A 9/1992 Hotomi et al.
5,442,387 A 8/1995 Loofbourow et al.
5,493,409 A 2/1996 Maeda et al.

(Continued)

FOREIGN PATENT DOCUMENTS

EP 0848540 A 6/1998

(Continued)

Primary Examiner—Keith T Ferguson

(57) ABSTRACT

A mobile phone is provided for capturing and printing images. The phone comprises a phone body defining front and rear faces. The front face has a keypad and display, and the rear face has a removable cover. A camera is fitted to the body and is configured to capture an image. A print media stock container is located approximately centrally within the body and is accessible when the cover is removed. A printer assembly is fitted within the body proximate to a base end of the body. The printer assembly includes an ink ejection printhead configured to print the captured image upon print media. The printer assembly further includes feed means provided between the print media stock container and the base end of the body. The feed means is configured to feed print media from the stock container past the printhead during printing.

7 Claims, 15 Drawing Sheets

U.S. PATENT DOCUMENTS

| | | |
|---|---|---|
| 5,559,932 A | 9/1996 | Machida et al. |
| 5,625,669 A | 4/1997 | McGregor et al. |
| 5,664,013 A | 9/1997 | Rossi |
| 5,719,936 A | 2/1998 | Hillenmayer |
| 6,035,214 A | 3/2000 | Henderson |
| 6,048,269 A | 4/2000 | Burns et al. |
| 6,064,492 A | 5/2000 | Eldridge et al. |
| 6,069,711 A | 5/2000 | Iwata |
| 6,095,633 A | 8/2000 | Harshbarger et al. |
| 6,116,715 A | 9/2000 | Lefebvre et al. |
| 6,119,931 A | 9/2000 | Novogrod |
| 6,126,268 A | 10/2000 | Askeland et al. |
| 6,166,826 A | 12/2000 | Yokoyama |
| 6,170,943 B1 | 1/2001 | Wen et al. |
| 6,172,688 B1 | 1/2001 | Iwasaki et al. |
| 6,219,229 B1 | 4/2001 | Lee |
| 6,234,389 B1 | 5/2001 | Valliani et al. |
| 6,241,350 B1 | 6/2001 | Otsuka et al. |
| 6,256,666 B1 | 7/2001 | Singhal |
| 6,267,520 B1 | 7/2001 | Unno et al. |
| 6,405,055 B1 | 6/2002 | Silverbrook |
| 6,480,724 B1 | 11/2002 | Erkkila et al. |

FOREIGN PATENT DOCUMENTS

| | | |
|---|---|---|
| JP | 09-113990 A | 5/1997 |
| WO | WO 97/04353 A | 2/1997 |
| WO | WO 97/50243 A | 12/1997 |

MOBILE PHONE FOR CAPTURING AND PRINTING IMAGES

CROSS REFERENCE TO RELATED APPLICATION

This is a Continuation application of U.S. Ser. No. 11/635,482 filed Dec. 8, 2006, which is a Continuation application of U.S. Ser. No. 11/144,800 filed Jun. 6, 2005, now issued U.S. Pat. No. 7,158,809, which is a Continuation application of Ser. No. 10/159,626 filed Jun. 3, 2002, now issued U.S. Pat. No. 6,915,140, which is a Continuation application of U.S. Ser. No. 09/436,507 filed Nov. 9, 1999, now issued U.S. Pat. No. 6,405,055, all of which is herein incorporated by reference.

FIELD OF THE INVENTION

The present invention relates to printing systems and more particularly, to a hand held mobile phone having an integral internal printer with print media supply.

SUMMARY OF THE INVENTION

It is an object of the present invention to provide a mobile phone system having a fully integral internal compact printer and print media supply.

In accordance with a first aspect of the present invention, there is provided a hand held mobile phone device with integral internal print apparatus and print media supply, said device comprising:
 a mobile telephone unit for transmitting and receiving signals;
 an internal print media storage unit;
 processing means for processing said received and transmitted signals into a printable form;
 a printhead and ink distribution unit assembly attached to said processing means for printing out said processed signals onto said print media; and
 print media feed means to feed said print media from said storage means to said printhead for printing of said processed signal information thereon.

In a first preferred form the print media comprises paper or card sheets. The cards are preferably substantially the size of an average business card. Desirably the printhead and the card storage unit form a snap fit with the mobile telephone unit.

In a second preferred form the print media is in the form of a paper print roll and more preferably the print roll is provided in a cartridge that also includes an integral ink supply.

The printhead can comprise a single unit of the width of the paper or cards and may be formed via semiconductor fabrication techniques.

The card storage unit can be detachable from the apparatus. The printhead or printhead and ink distribution unit assembly can be separately detachable from the phone apparatus and the print media storage unit.

The printhead can comprise a full colour printhead attached via an ink distribution unit to a series of ink supply reservoirs to supply separate colours to each of the colours of the printhead.

The printhead can comprise an array of ink ejection nozzle arrangements wherein liquid can be ejected by means of activation of a corresponding thermal bend actuator attached to each of the nozzle arrangements.

The printhead preferably can include a series of attached ink supply reservoirs with a first reservoir being substantially larger then the others. The printhead and ink distribution unit and/or the print roll cartridge preferably can include an authentication chip which ensures use of only approved consumables and which can also be used to set a predetermined amount of usage of each item.

The hand held mobile phone can be of any kind and utilising any communications system so long as the transmitted signals can be processed into a printable form. Examples of suitable phone types and/or communications systems include GSM, CDMA, PHS, satellite phone systems, and third generation (3G) internet connected mobile phone systems including GPRS and WCDMA.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF PREFERRED AND OTHER EMBODIMENTS

In both embodiments, there is provided a mobile phone having an internal detachable printer which includes a separately detachable printhead and ink distribution unit assembly and further a preferably separately detachable paper or other print media supply. The mobile phone printer of at least the first preferred embodiment is of a standard size thereby conferring a high level of convenience during operation. The primary differences between the two embodiments relate to form of the print media and the location of the ink supply.

Figure 1:
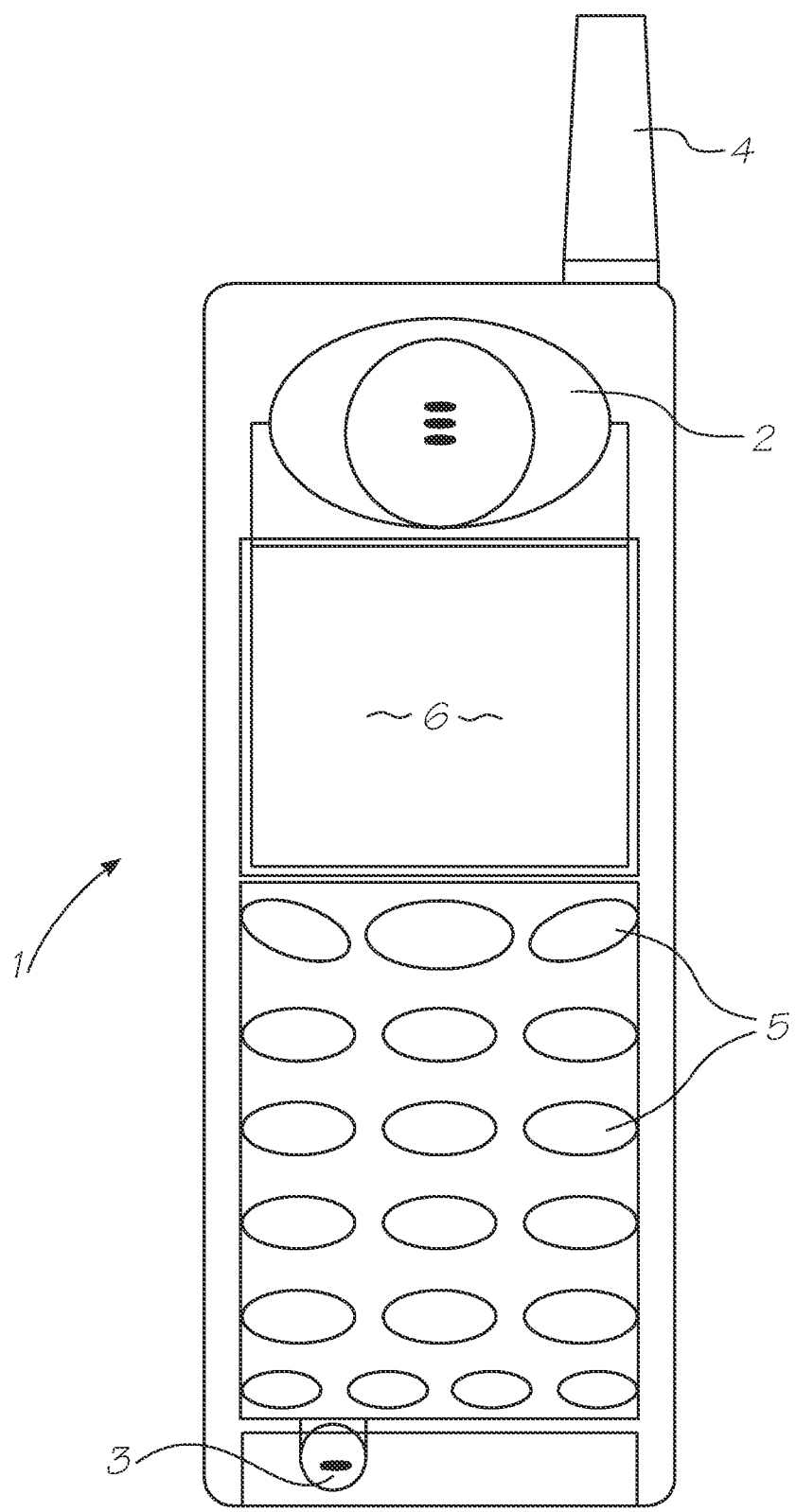
FIG. 1 is a front view of a first preferred embodiment.

Turning initially to FIG. 1, there is illustrated the first preferred embodiment printer phone 1 which looks like a conventional mobile phone including an earpiece 2, microphone 3, aerial 4, a series of push buttons 5 and a preferably colour LCD screen 6 for the display of information.

Figure 2:
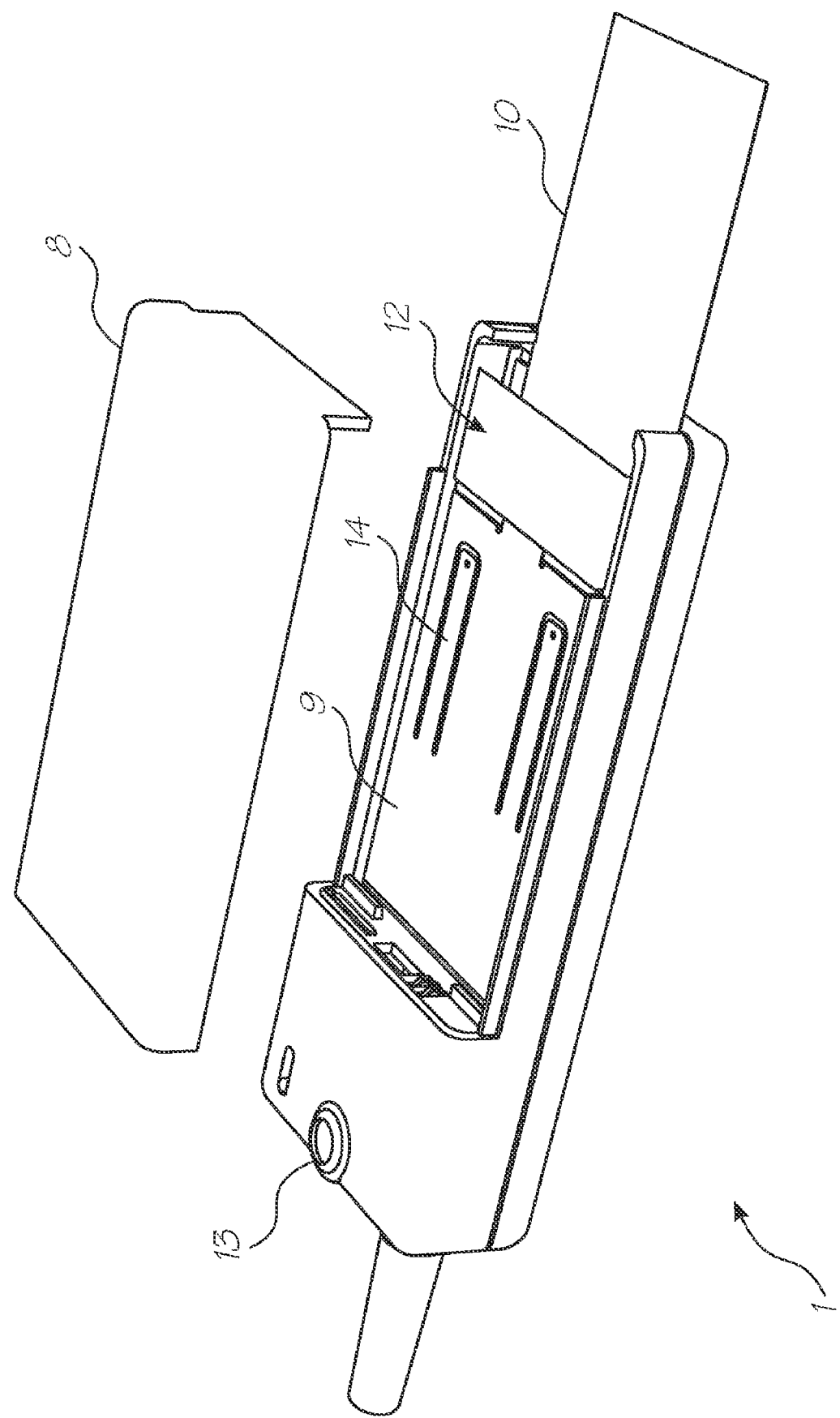
FIG. 2 is an exploded perspective view of the rear of the first embodiment.

In FIG. 2, the back portions of the first embodiment phone 1 is shown with the battery cover 8 removed so as to reveal a print media stock container 9 from which business card sized cards or sheets 10 are used on which to print images on by a printer unit 12. The print out onto the card can be processed signal information downloaded via the mobile phone 1 such as e-mail or other facilities.

The mobile phone can optionally be equipped with a camera device 13 which can comprise, for example, a CMOS sensor designed to sense and store images on demand so that the mobile phone 1 can effectively act as a camera device for the printing out of images or their capture and forwarding across a mobile network.

Figure 3:
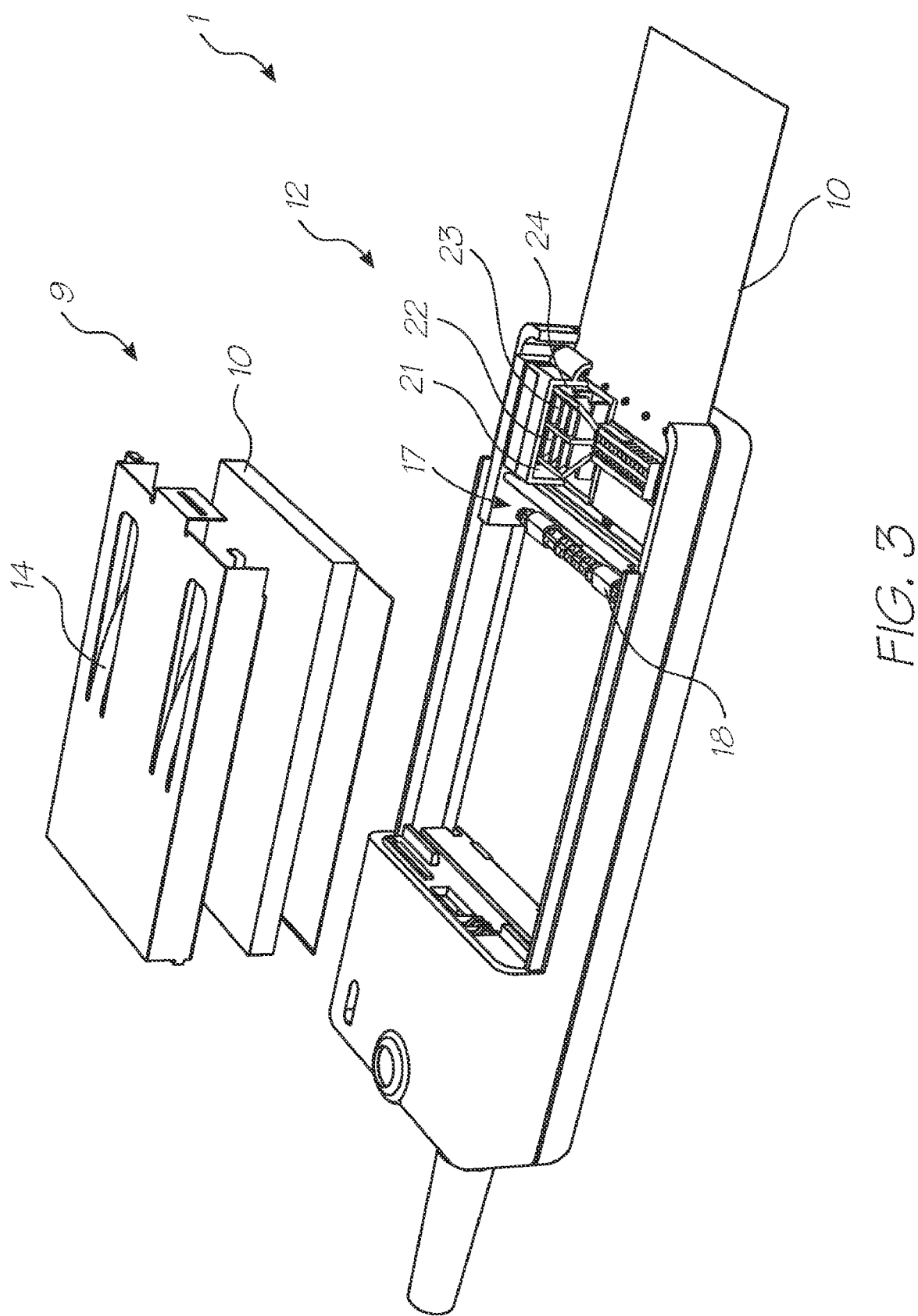
FIG. 3 is a further exploded perspective view, partly in section, of the first embodiment showing more detail of the internal structures.
Figure 4:
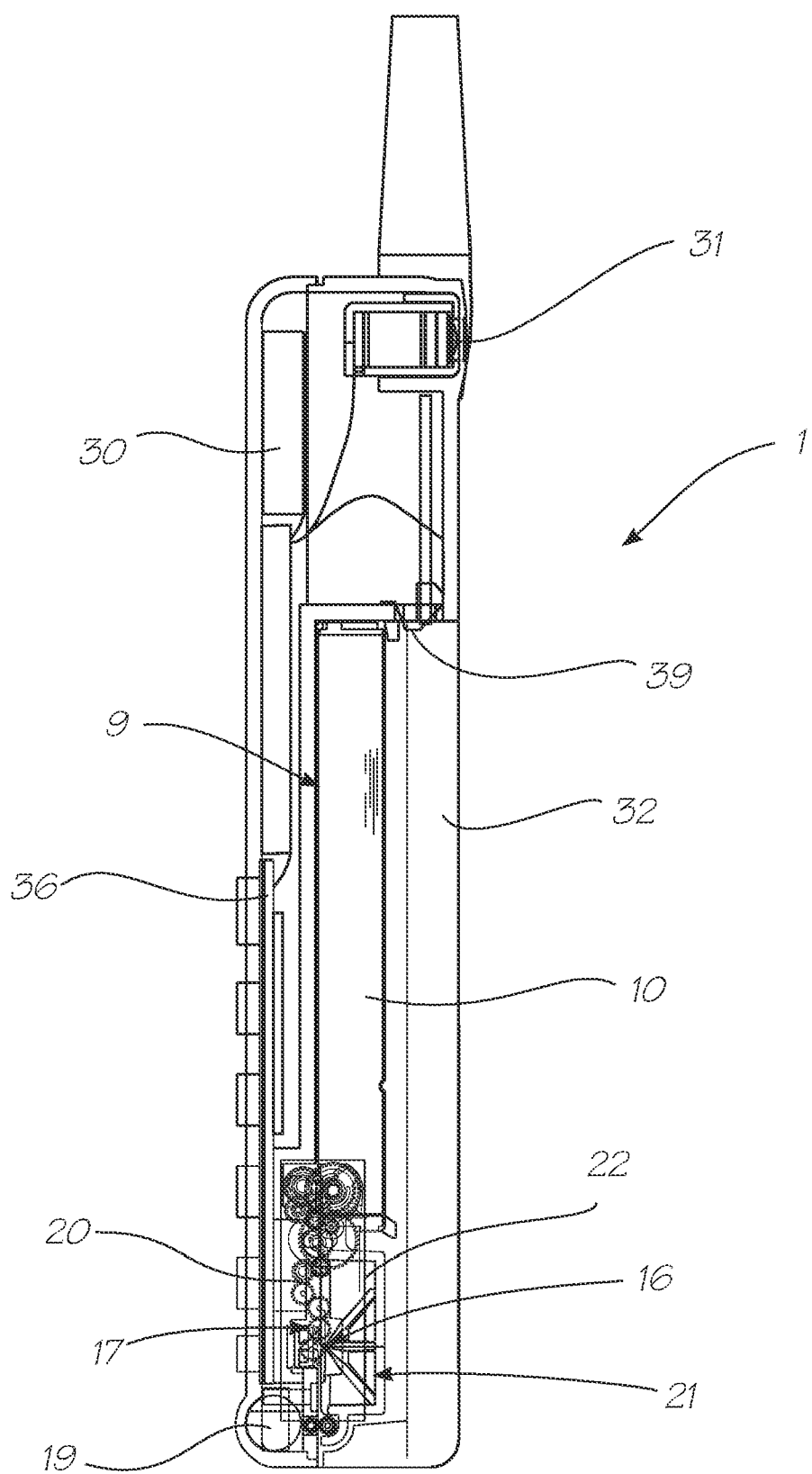
FIGS. 4 and 5 are sectional rear and side views of the first embodiment respectively.

In FIG. 3, there is illustrated an exploded perspective view, partly in section, of the first mobile phone device 1 showing more detail of the printer assembly 12 including the printhead assembly 16 and feed means 17. The paper stock container 9 includes a series of cards 10 which are resiliently compressed by means of leaf springs 14. As shown in the other figures, the print media feed means 17 are provided in the form of pinch rollers 18 which are driven by motor 19 via gear train 20 and which is used to drive individual cards 10 to and past the printhead 16. The printhead may form part of an optionally replaceable printhead and ink distribution unit assembly 21 including an ink distribution unit 22 and can be substantially the same as that disclosed in Australian Provisional Patent No. PP6534 entitled "Micromechanical Device and Method (IJ46A)" filed 16 Oct. 1998 the contents of which are hereby incorporated by cross-reference.

Figure 5:
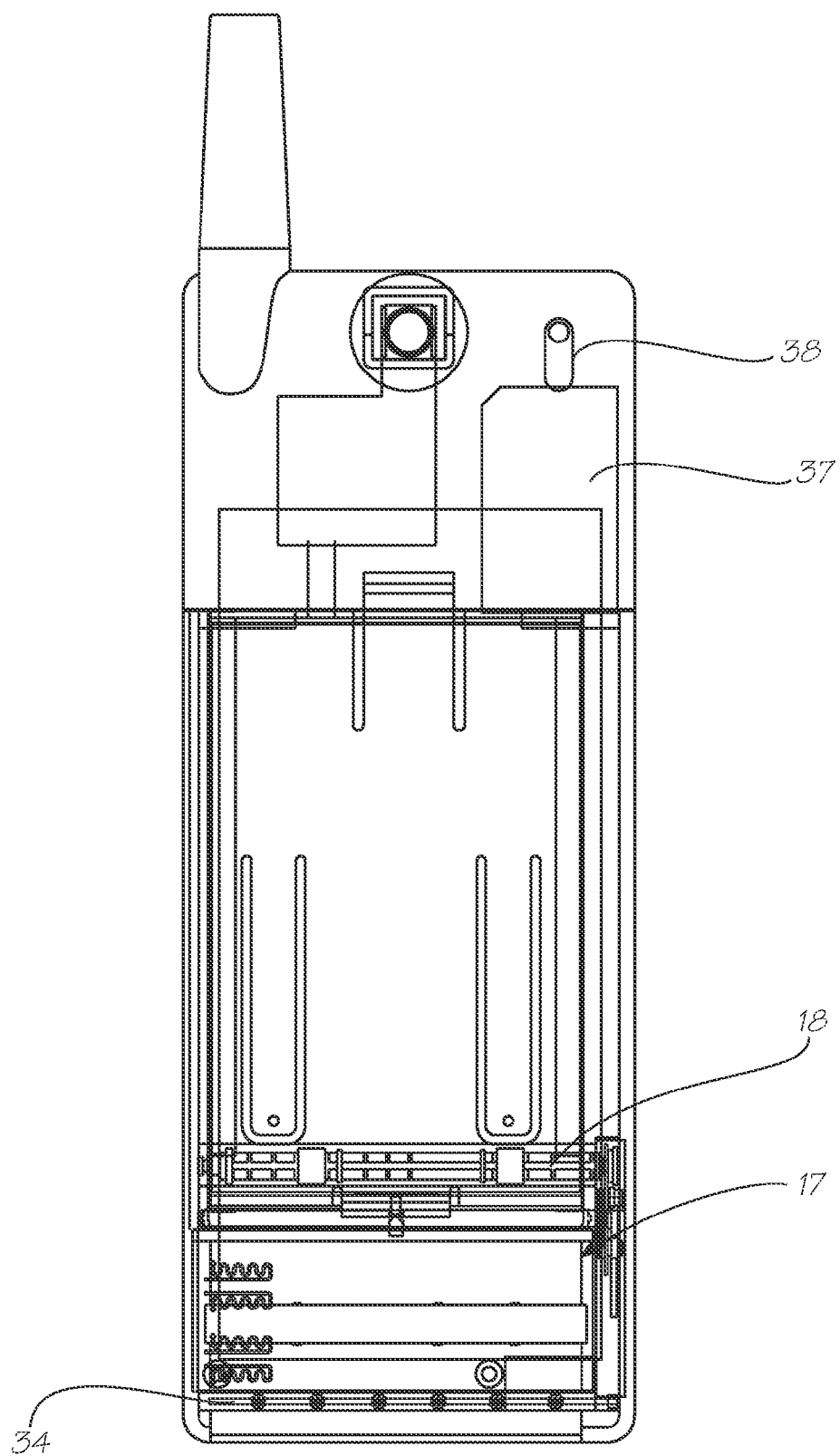
Figure 6:
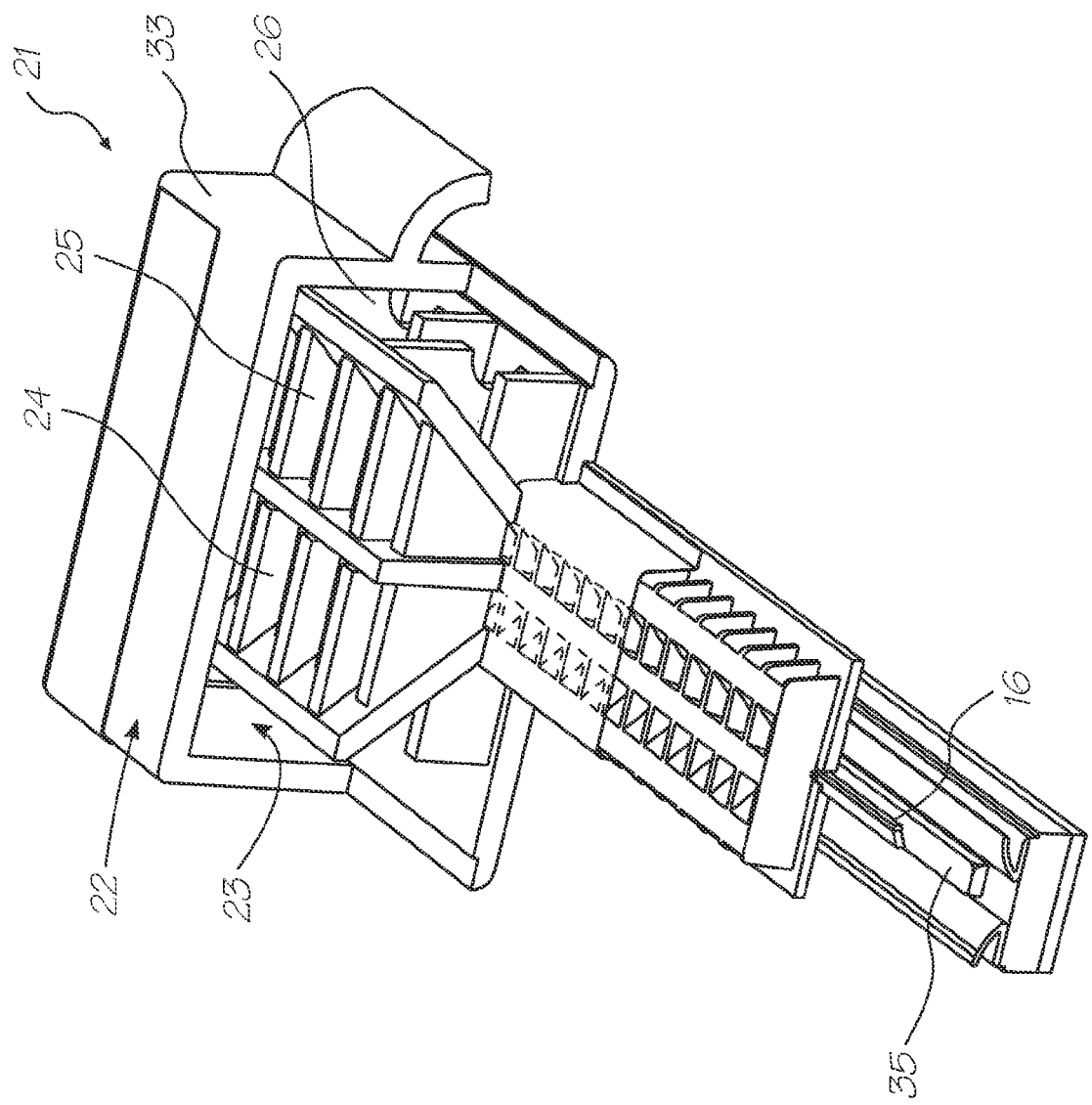
FIG. 6 is a sectional perspective view of the print apparatus of the first embodiment.

The ink distribution unit 22 of this first embodiment includes a series of ink supply reservoirs 23 to 26 which are provided for full colour printing. The reservoir 23 is substantially larger than the reservoirs 22 to 26 and can be utilized to store black ink. It is estimated that the ink supply will be sufficient for printing of approximately 2000 pages at 15% coverage of black or 200 photos of 50% coverage of CMYK. A more detailed view of the printer assembly 12 is illustrated in FIG. 5 with an expanded technical description being disclosed in the aforementioned provisional patent specification.

Figure 7:
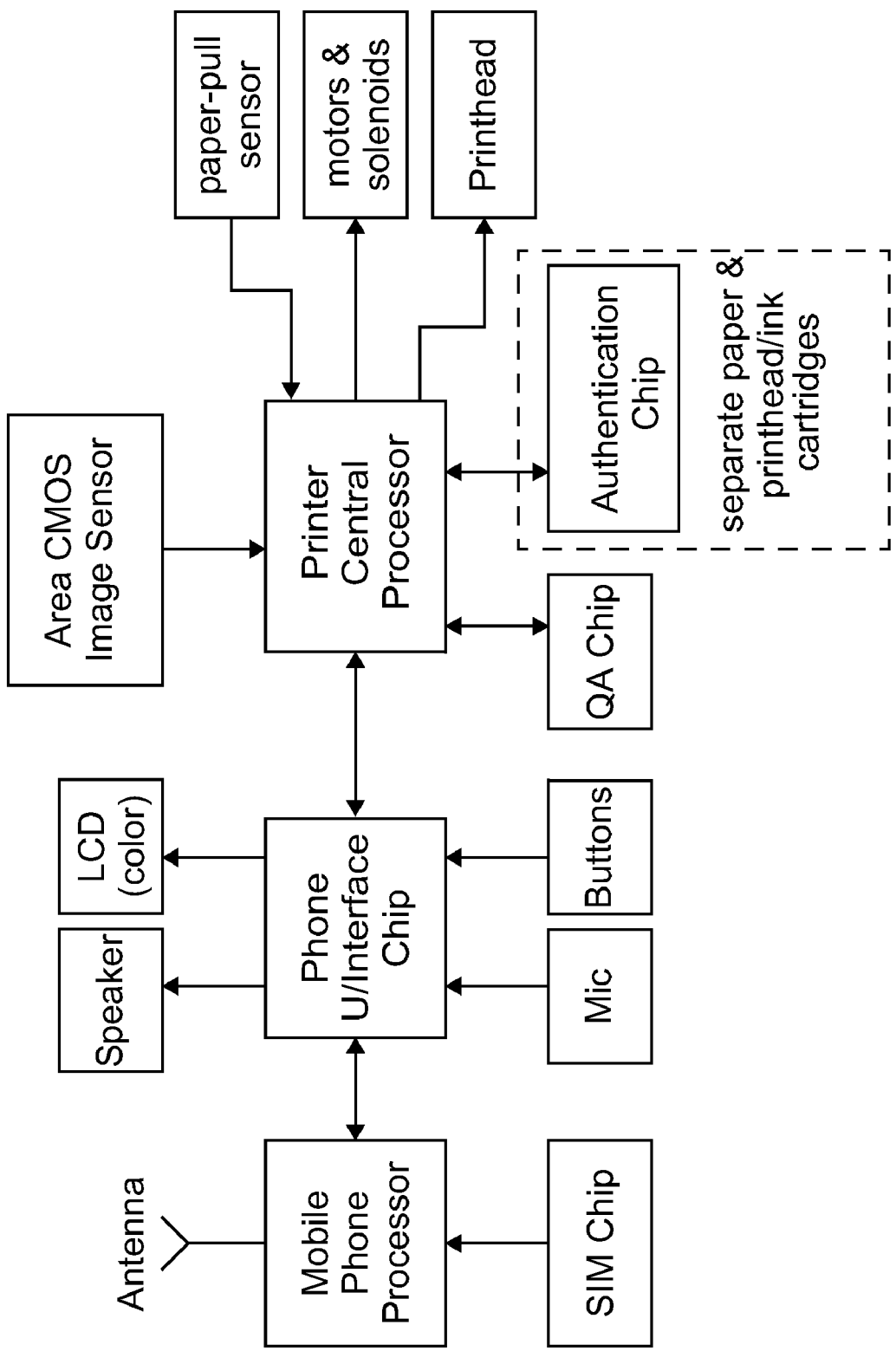
FIG. 7 is a schematic block diagram showing the electrical interconnections for the first embodiment.
Figure 8:
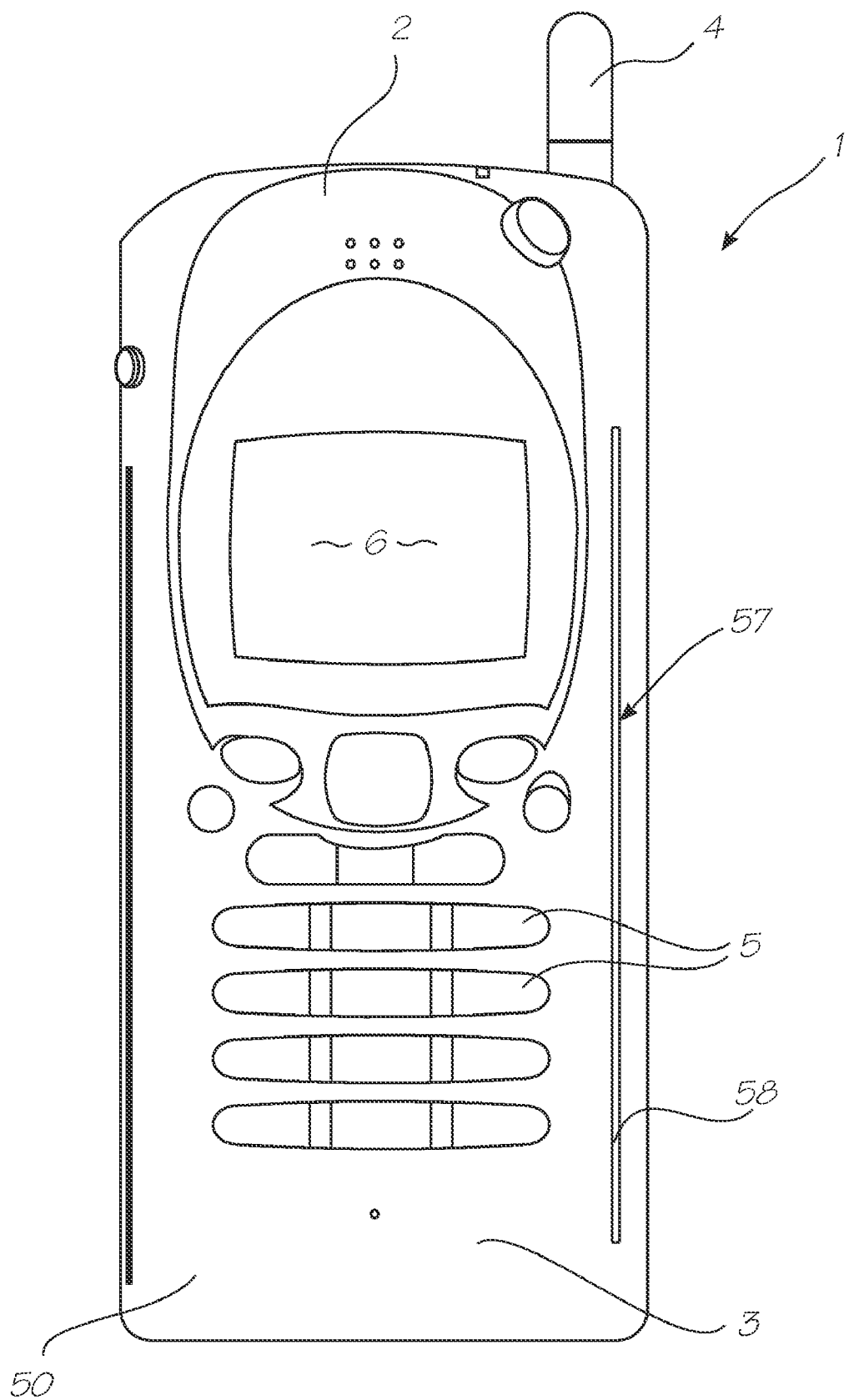
FIG. 8 is a front view of a second preferred embodiment utilising a paper and ink cartridge and having a scanning facility.
Figure 9:
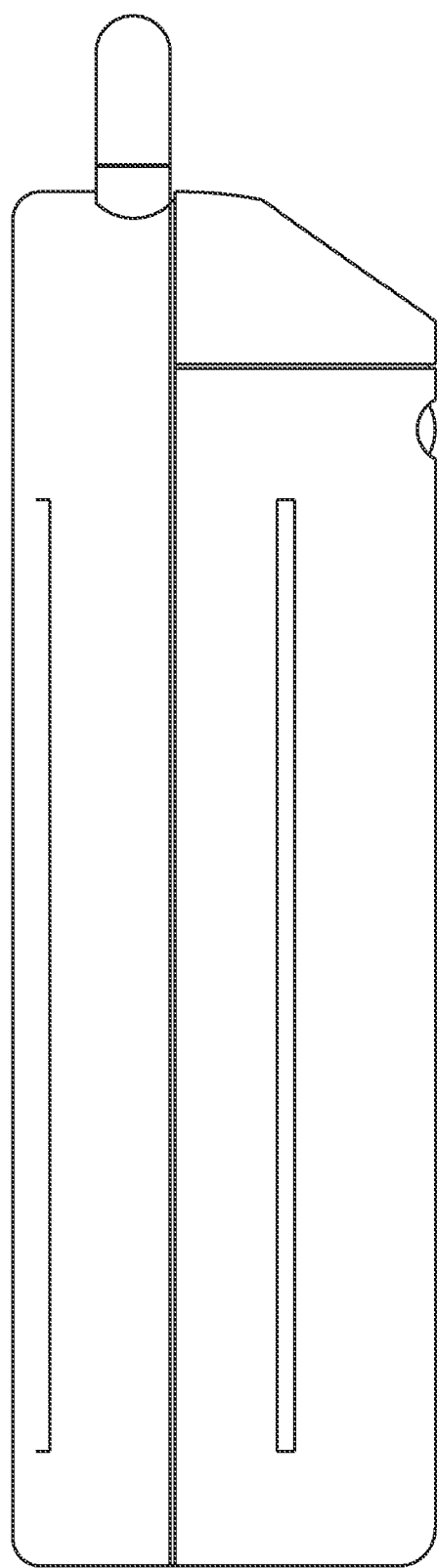
FIG. 9 is a right hand side view of the second embodiment printer phone shown in FIG. 8.
Figure 10:
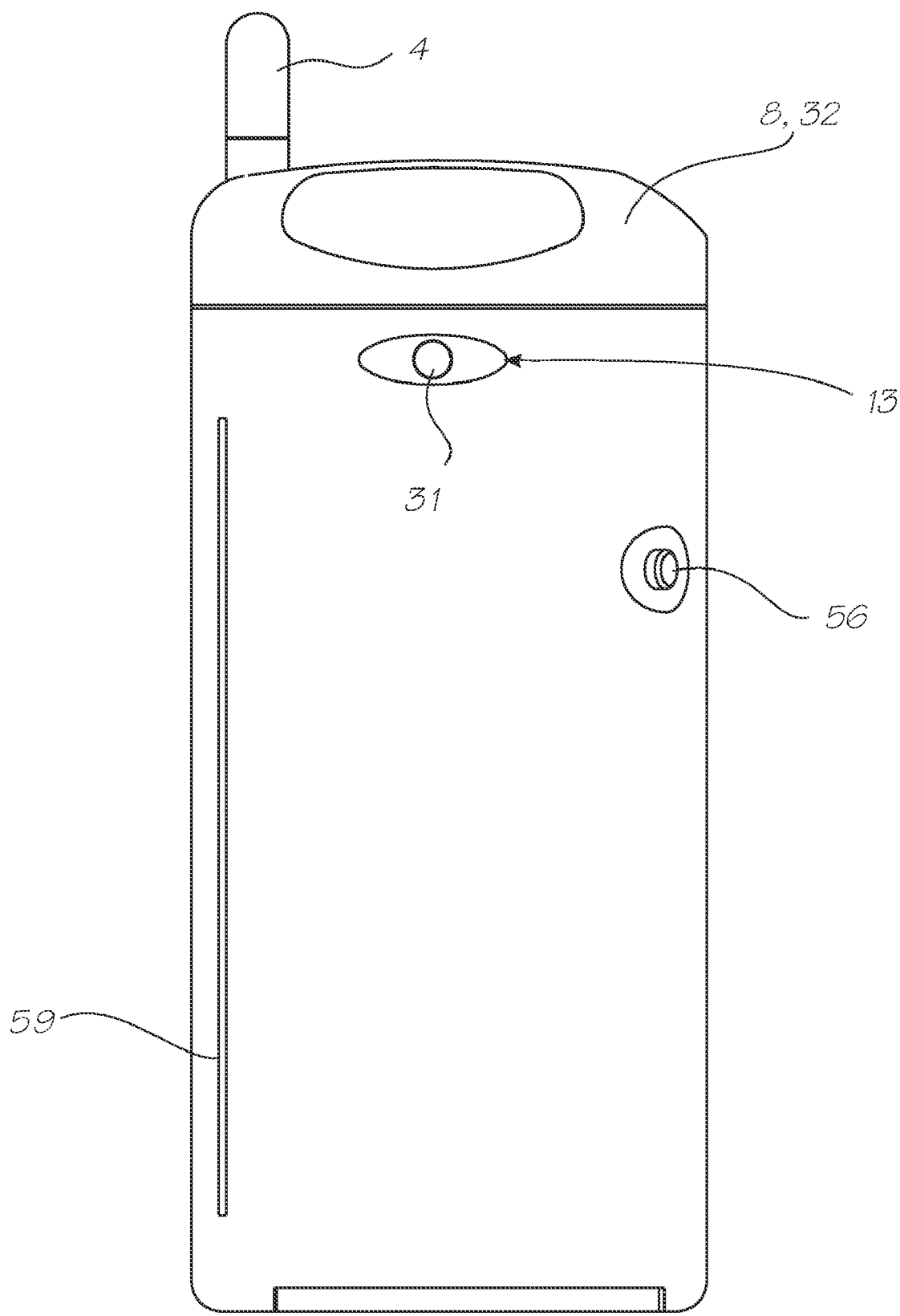
FIG. 10 is a rear view of the second embodiment printer phone shown in FIGS. 8 and 9.
Figure 11:
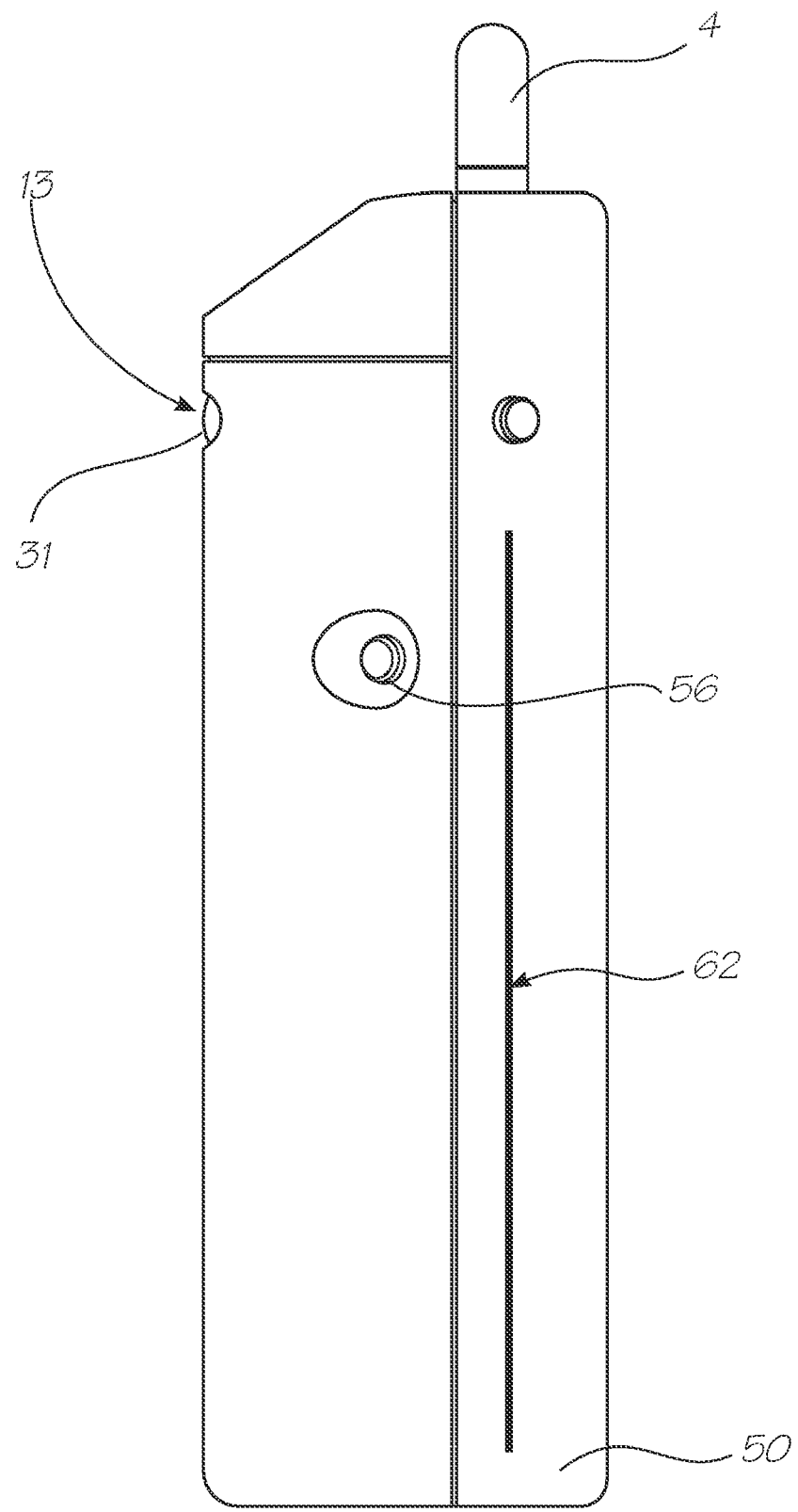
FIG. 11 is a left hand side view of the printer phone shown in FIG. 8.
Figure 12:
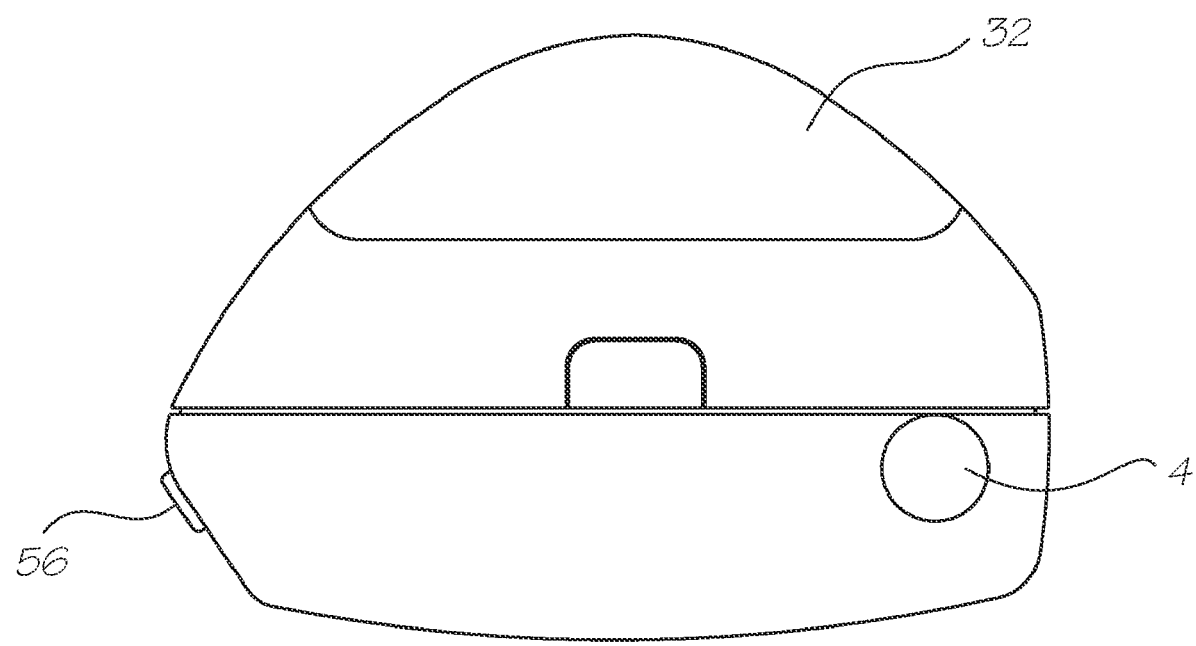
FIG. 12 is a top plan view of the printer phone shown in FIG. 8.
Figure 13:
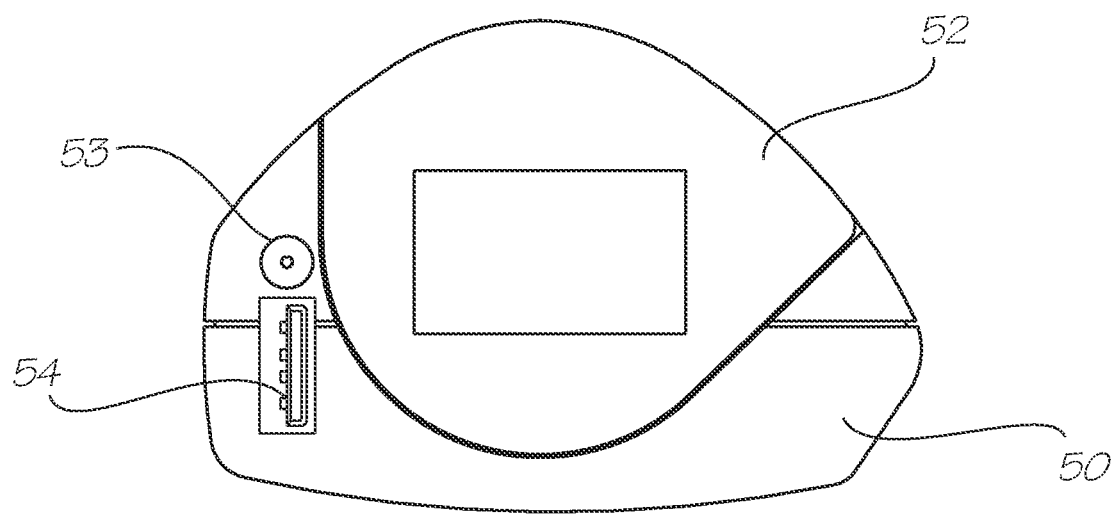
FIG. 13 is an inverted plan view of the printer phone shown in FIG. 8.
Figure 14:
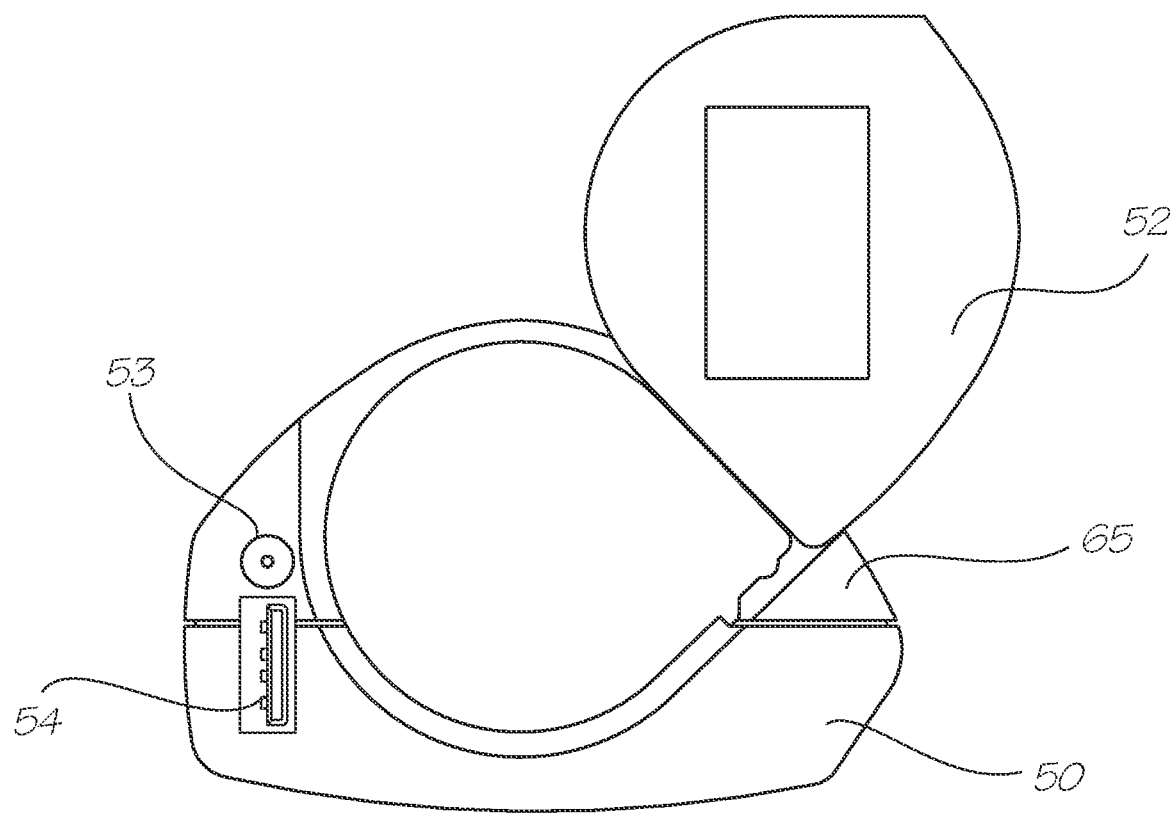
FIG. 14 is an inverted plan view as shown in FIG. 13 illustrated with the print roll hatch in the open position.

The mobile phone system can be operated electronically under the control of a series of one or more application specific integrated circuits (ASICS) which incorporate the usual mobile phone capabilities in addition to camera and image processing capabilities. A sample block diagram indicating the electrical interconnections for this first embodiment is shown in FIG. 7. A suitable adaptation of the system as outlined in PCT Patent Application PCT/AU98/00544 filed by the present application can be utilized in the design of the ASIC. Other alternative system designs can be incorporated in accordance with the knowledge of those skilled in this particular field.

Other features/components of the phone device, the function of which will be readily apparent, are identified in the accompanying illustrations by the following reference numerals.

| Reference Numeral | Feature/component |
|---|---|
| 30 | loud speaker |
| 31 | camera lens array |
| 32 | NiMh Battery |
| 33 | Printhead cover molding |
| 34 | Paper exit wheels |

-continued

| Reference Numeral | Feature/component |
|---|---|
| 35 | Printhead capping mechanism |
| 36 | Telephone PCB with buttons |
| 37 | SIM card |
| 38 | SIM card ejector |
| 39 | Battery contacts |

Turning next to FIGS. 8 to 15, there is shown a second embodiment printer phone according to the invention. Wherever possible like reference numerals will be used to denote corresponding features.

The major differences between the two embodiments are that instead of having a card dispenser and printhead with integral ink supply, this second embodiment utilises a replaceable combined paper and ink print roll cartridge. The cartridge can be substantially the same as that described in the applicant's earlier applications U.S. Ser. No. 09/113,073 "Digital Camera System with Integral Print Roll"; U.S. Ser. No. 09/113,053 "Print Media Roll and Ink Replaceable Cartridge"; U.S. Ser. No. 09/112,744 "Anisotropic Rigidity to Reduce Curl in Rolled Media"; U.S. Ser. No. 09/112,823 "Miniature Color Printer using Ink and Paper Cartridges"; and U.S. Ser. No. 09/112,783 "Ink and Media Cartridge with Axial Ink Chambers" the contents all of which are incorporated herein by cross reference.

Another difference resides in the optional inclusion of a scanning facility, which whilst described with reference to the second embodiment, could also be included in the first embodiment, although it is envisaged that in practice this facility is better suited for use with print media in the form of a print roll. Further, the additional space required to accommodate the scanning facility is less of a problem with the second embodiment which by design cannot be as compact as the first embodiment. More details of these different features are described below.

In the second embodiment, the phone casing 50 is configured to receive the paper and ink print roll cartridge 51 via a cartridge hatch 52 formed in the base of the phone. Also provided in the base of the phone are the usual DC in and USB connectors 53 and 54.

In this particular embodiment, the camera device 13 is located on the rear of the phone and is operable via a camera take button 56. The printer phone may also include a scanning head (not shown) in the form of a linear CMOS image sensor which is located within the right hand side of the casing adjacent an image scan path defined by a scanning image slot 57 having an entry 58 in the front of the phone and an exit 59 at the rear of the phone.

Figure 15:
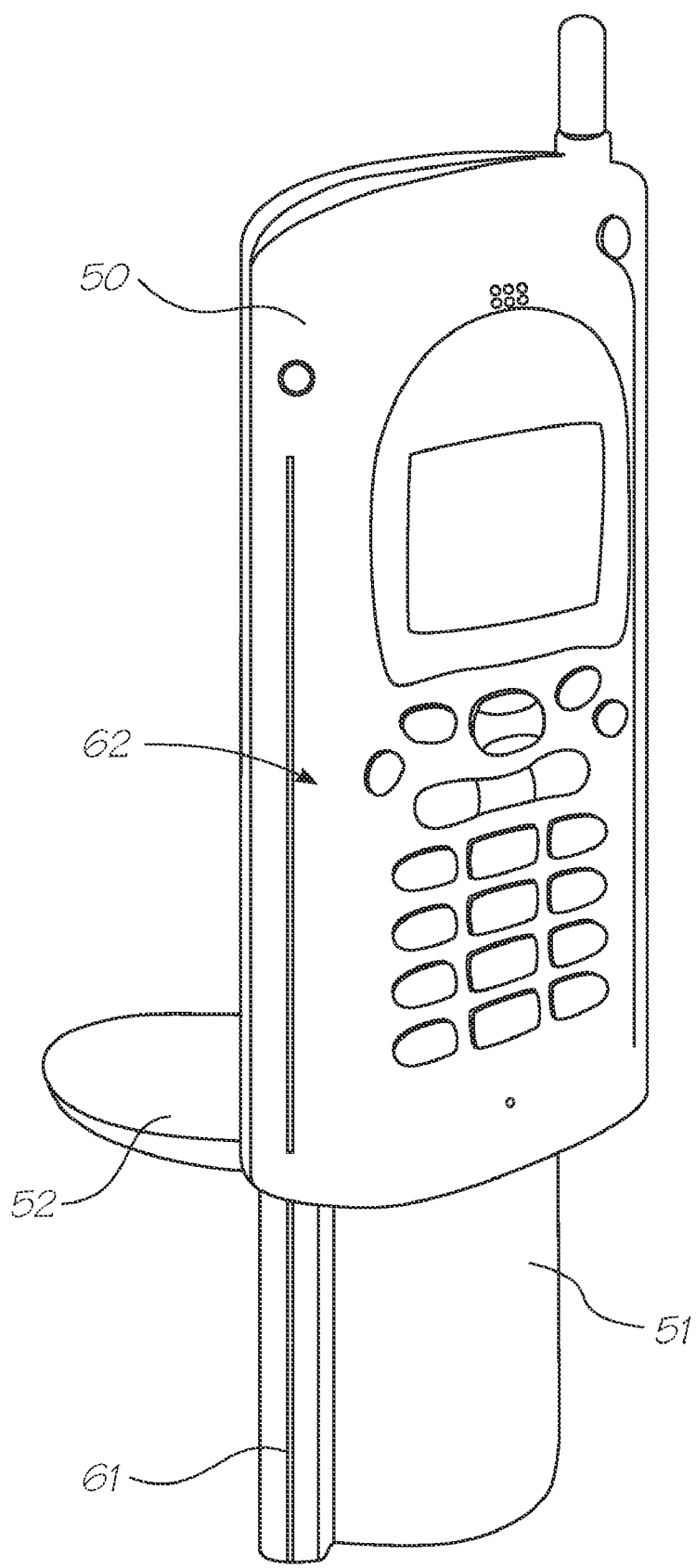
FIG. 15 is a perspective view of the printer phone of FIG. 8 illustrating insertion/removal of the print roll via the print roll hatch.
Figure 16:
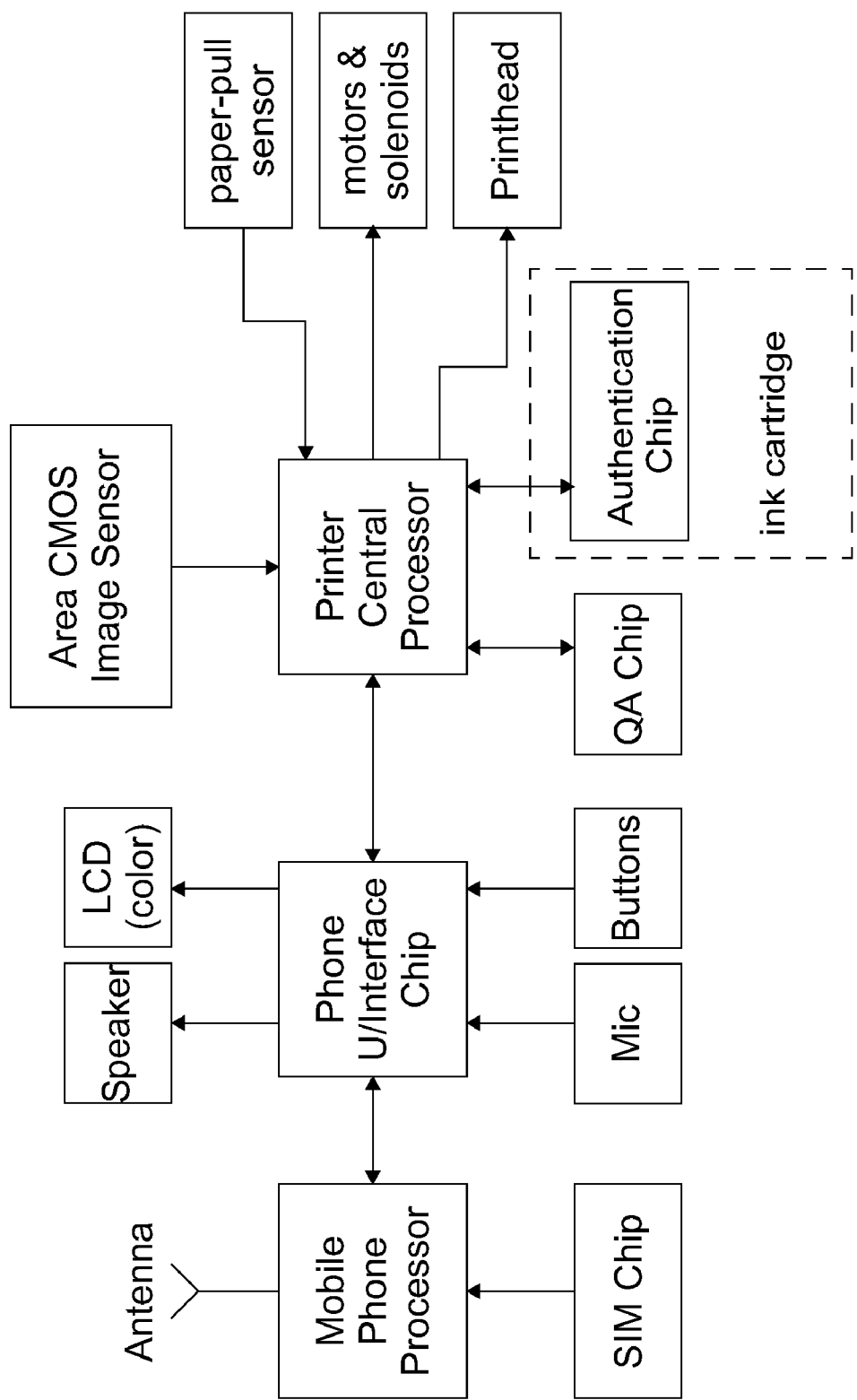
FIG. 16 is a schematic block diagram showing the electrical interconnections for the second embodiment.

As can be best seen in FIG. 15, the paper and ink print roll cartridge 51 is of similar shape to a conventional 35 mm camera film cartridge, having a paper exit 61 which when installed aligns with a corresponding printer exit slot 62 formed in the front left hand side of the phone casing 50. However, the cartridge 51 is substantially longer, as it preferably contains sufficient print media and ink for 36 images, each 100 mm×150 mm, the customary size of a photographic print. The printhead and ink distribution unit assembly 21 is located behind the portion of the base molding identified at 65.

The second embodiment printer phone 1 can also be operated under the control of a series of one or more ASIC chips which incorporate the usual mobile phone capabilities in addition to camera and scanner image processing capabilities. Again, a suitable adaptation of the system as outlined in PCT Patent Application PCT/AU98/00544 filed by the present application can be utilised in the design of the ASIC chip.

In use, the operation of this second embodiment is very similar to that of the first with the exception of the additional scanner facility. Replacement of the paper and ink supply is achieved by simply opening the cartridge hatch 52, removing the old cartridge and inserting a new one. The cartridge includes pierceable ink outlets which engage nozzles on the ink distribution assembly connected with the printhead.

It will be appreciated by a person skilled in the art that numerous variations and/or modifications may be made to the present invention as shown in the specific embodiment without departing from the spirit or scope of the invention as broadly described. The present embodiment is, therefore, to be considered in all respects to be illustrative and not restrictive.

I claim:

1. A mobile phone comprising:
   a phone body defining front and rear faces, the front face having a keypad and display and the rear face having a removable cover;
   a camera fitted to the body and configured to capture an image;
   a print media stock container located approximately centrally within the body and accessible when the cover is removed; and
   a printer assembly fitted within the body, proximate to a base end of the body, the printer assembly including an ink ejection printhead configured to print the captured image upon print media, the printer assembly further including feed means provided between the print media stock container and the base end of the body, the feed means configured to feed print media from the stock container and past the printhead during printing.

2. A mobile phone as claimed in claim 1, wherein the stock container includes leaf springs for releasably compressing a print media stack stored therein.

3. A mobile phone as claimed in claim 1, wherein the print media feed means includes pinch rollers which are driven by a motor via a gear train.

4. A mobile phone as claimed in claim 1, wherein the printer assembly includes a replaceable printhead and ink distribution unit assembly, in turn, including the printhead and an ink distribution unit configured to distribute ink to the printhead.

5. A mobile phone as claimed in claim 4, wherein the ink distribution unit includes a series of ink supply reservoirs for containing respective types of ink, one reservoir being substantially larger than the other reservoirs.

6. A mobile phone as claimed in claim 1, wherein the cover defines a lip which projects along the phone base and defines an edge of the slot.

7. A mobile phone as claimed in claim 1, wherein the stock container is sized to receive business card sized print media cards.

\* \* \* \* \*